Figure 1:
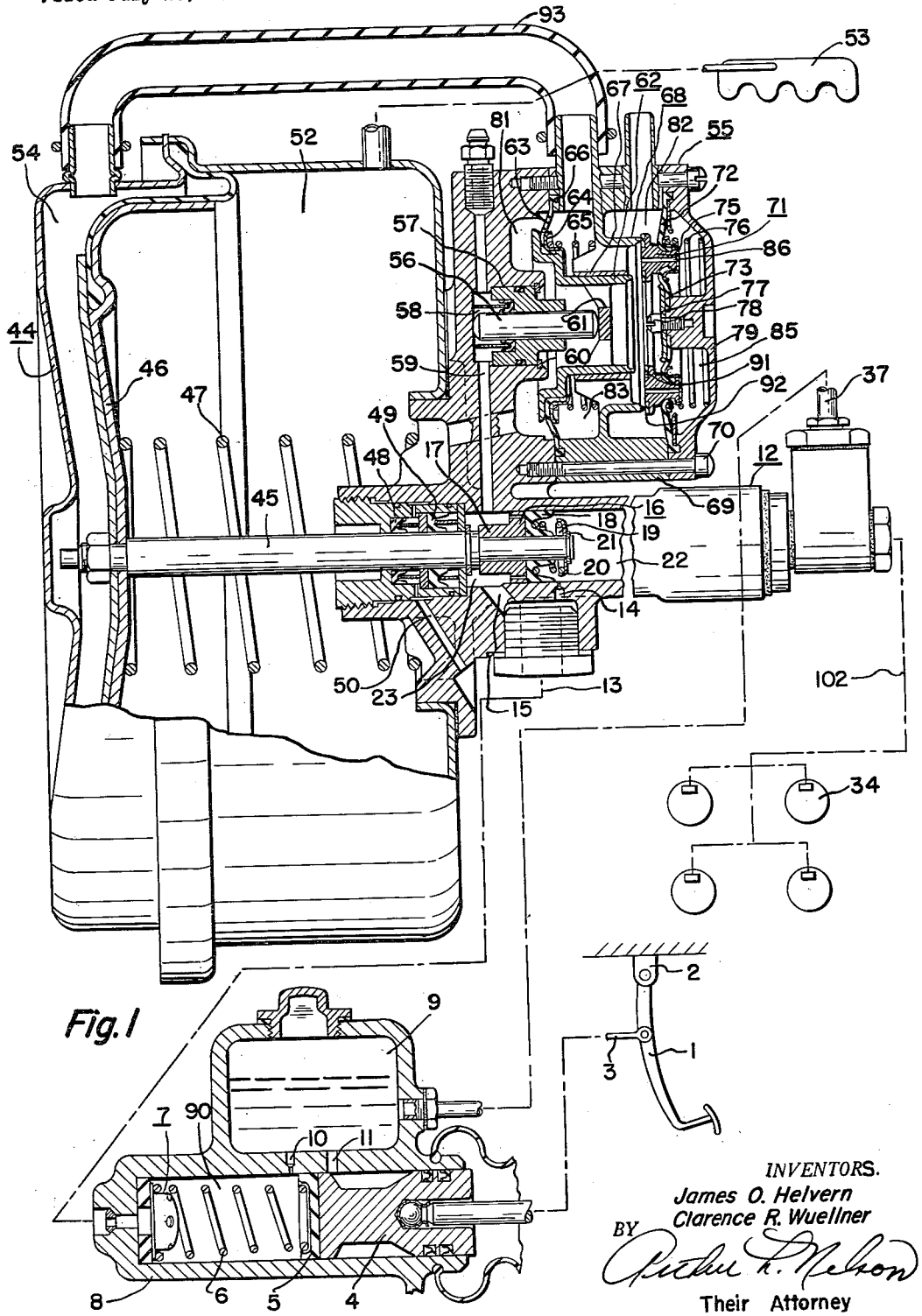

INVENTORS.
James O. Helvern
Clarence R. Wuellner
BY
Their Attorney

United States Patent Office 3,099,941
Patented Aug. 6, 1963

3,099,941
BRAKE BOOSTER UNIT
James O. Helvern, Lewisburg, and Clarence R. Wuellner, Dayton, Ohio, assignors to General Motors Corporation, Detroit, Mich., a corporation of Delaware
Filed July 29, 1960, Ser. No. 46,124
6 Claims. (Cl. 91—434)

This invention relates to a brake booster unit and more particularly to the venting means in the hydraulic fluid system and the reaction means created in the fluid system.

The operator of a brake booster unit controls the actuation of the vehicle brakes. The operator of the brakes must know the degree of operation of the vehicle brakes to maintain control of the motor vehicle. The degree of actuation is indicated through the reaction transmitted through the brake pedal of the manually operated means. The reaction should be in direct proportion to the degree of actuation to give an accurate indication to the operator of the vehicle brakes. The degree of pressurization of the expansible fluid within the booster unit driving the power wall forward to actuate the vehicle brakes provides an accurate measure of the degree of actuation of the vehicle brakes. Accordingly, this invention is intended to provide a reaction means which increases in direct proportion to this increased actuating force for the vehicle brakes. This invention provides reaction transmitted from the increasing pressure operating the booster unit which is transmitted through the hydraulic fluid medium from the control valves to the manually operated master cylinder.

It is an object of this invention to provide a reaction means operating in proportion to the degree of pressurization of fluid operating the booster unit.

It is another object of this invention to derive the reaction force from the pressurization of expansible fluid for operating the booster unit.

It is a further object of this invention to provide a venting means for the power master cylinder connecting with the manually operated master cylinder to maintain adequate fluid in the power master cylinder at all times to provide the reaction transmitting means from the expansible fluid for operating the booster unit to the manually operated cylinder.

It is a further object of this invention to provide a pressure balanced valve seat member to eliminate any pressure variations on opposing sides of the valve seat member which may prevent uniform operation of the valves due to inequalities in pressure on the valve members.

The objects of this invention are accomplished by employing a manually operated fluid displacement means in communication with a power operated fluid displacement means adapted for actuating a plurality of vehicle wheel brakes. The power operated master cylinder receives a power displacement member operated by the booster unit. In connection with the manually operated and the power operated fluid displacement members there is also connected a valve operating fluid displacement means. The valves controlling the booster unit are operated in response to fluid displacement by the manually operated master cylinder which, in turn, operates the vacuum and the air valves for operation of the booster unit.

A balanced valve seat member mounted concentric with the air valve and the vacuum valve operates with equalized pressures on opposing sides of the valve seat member. The reaction is derived from the variable pressure expansible fluid employed in operating the booster unit which is transmitted through an hydraulic fluid medium to the manually operated fluid displacement means. The degree of reaction is in direct proportion to the increase in the pressurization of the expansible fluid which drives the power wall to pressurize fluid in actuation of the vehicle brakes. The fluid displaced in the power master cylinder in the follow-up chamber behind the power piston does not provide a reaction force, but merely provides a change in volume as the vehicle brakes are actuated. The force provides an assisting action on the power master piston and permits flow of fluid behind the power master piston although the reaction is derived from pressurized fluid in the valve means.

Further objects and advantages of the present invention will be apparent from the following description, reference being had to the accompanying drawings wherein preferred embodiments of the present invention are clearly shown.

Figure 2:
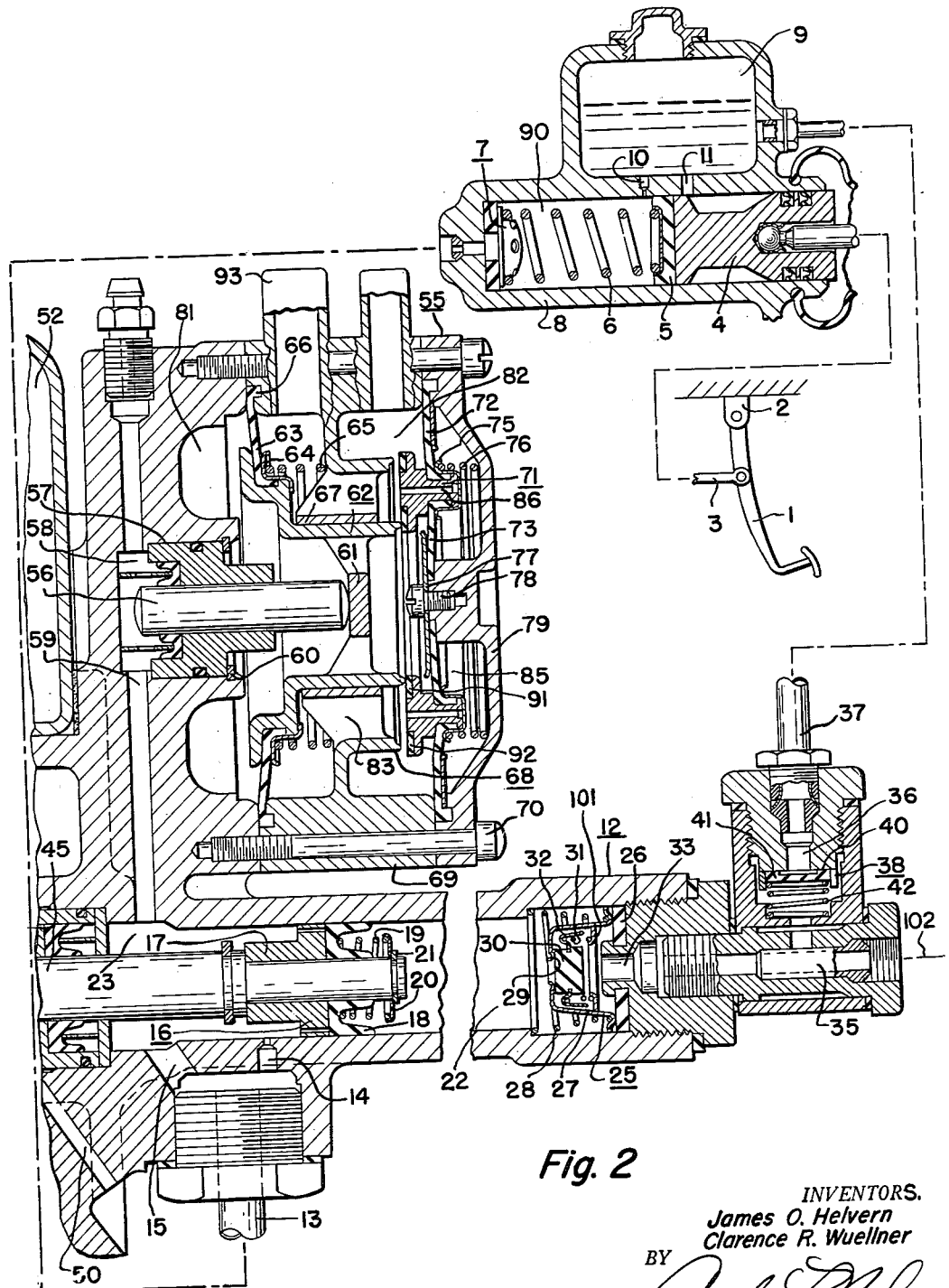

In the drawings:
FIGURE 1 is a cross section view of the booster unit and master cylinder.
FIGURE 2 is a cross section view of the venting means for the power master cylinder.

The manually operated master cylinder is operated by the brake pedal 1 pivotally mounted to the chassis 2 and pivotally connected to a push rod 3. The push rod 3 extends forwardly into the rearward end of the piston 4. The forward end of the piston 4 receives the seal 5 which is maintained in position by retraction spring 6 bearing against the valve assembly 7. The master cylinder 8 is formed with a reservoir 9 for containing fluid to replenish the hydraulic fluid system. The reservoir 9 is in communication with the pressurizing chamber in the cylinder 8 through the vent 10 and port 11.

The power master cylinder 12 is in communication with the manually operated master cylinder 8 through the conduit 13. The conduit 13 feeds into the power master cylinder 12 through the orifice 14 and the passage 15. The power master cylinder 12 receives a power piston 16 including the sleeve 17 and seal 18. The seal 18 is retained in its position on the forward facing of the sleeve 17 by the spring 19 maintaining its position by the retainer 20 and snap ring 21. The power piston 16 divides the interior portion of the master cylinder 12 in a pressurizing chamber 22 forward of the master piston and a follow-up chamber 23 rearward of the master piston 16.

The forward end of the power master cylinder 12 receives the check valve assembly 25 which includes a rubber annulus 26 positioned against the facing on the forward end of the power cylinder 12. The rubber annulus 26 operates as a valve seat for the valve element 27. The valve element 27 is maintained in a contacting position on the annulus 26 by the spring 28.

The outlet valve is formed by the annular ridge 29 on the valve element 27. The rubber disk 30 seats on the annular ridge 29 due to the biasing force of the spring 31 operating on the spring retainer 32 which is connected to the rubber disk 30. The spring 31 also seats on the retainer 101 on the inner periphery of the element 27. The outlet pressure required to operate the outlet valve is approximately 50 pounds and substantially higher than that of the conventional type of check valve mounted in the forward end of the master cylinder.

The fluid passing from the power master cylinder 12 leaves the master cylinder through the port 33 and is distributed to the plurality of wheel cylinders for the wheel brakes 34 through conduit means 102.

In communication with the passage 35 leading to the plurality of wheel brakes is a second passage 36 which feeds into the conduit 37 and reservoir 9 on the manually operated master cylinder 8. The passage 36 is provided with a check valve assembly 38 which operates on approximately 2 to 4 pounds pressure per square inch. The valve seat is formed by the annular facing 40 and the check valve 41 seats on the annular facing 40 due to the biasing force of spring 42. The check valve assembly 38 provides for flow of fluid from the manually operated master cylinder reservoir 9 into the passage 36 when a a decrease in pressure is present within the passage 36. In this manner the passage 36 is maintained full of fluid at all times. This fact is important in that the operation of the unit requires that fluid be maintained in the system to prevent leakage due to a partial vacuum in the system.

The booster unit 44 provides the power operation of the power piston 16. The power piston 16 is connected by the rod 45 to the power wall 46. The power wall 46 is retracted by means of the spring 47 operating against the power wall of the booster unit and biasing the power wall 46 to its rearward position. The rod 45 extends forwardly through the vacuum seal assembly 48 and the hydraulic fluid seal assembly 49. A vent 50 is connected between the vacuum seal 48 and the hydraulic seal 49 to drain fluid to the outside of the booster unit in the event of a leakage through the hydraulic seal.

The booster unit 44 is formed with a constant pressure chamber 52 which is in communication with an engine manifold 53 at all times. The variable pressure compartment formed by the power wall 46 is in communication with the valve means 55 through the conduit 93.

The valve means 55 is operated by a fluid responsive piston 56 operating within the valve cylinder 57. The fluid piston 56 operates within a chamber 58 in the rearward end of the valve means which is in communication with the follow-up chamber 23 through the passage 59. The valve cylinder 57 is retained in its position by the snap ring 60.

The forward end of the valve piston 56 engages a central wall 61 in the vacuum valve 62. The vacuum valve 62 is supported by a vacuum valve diaphragm 63 on its outer periphery. The inner periphery of the vacuum valve diaphragm is retained in its position by a spring seat 64 which retains the vacuum valve spring 65. The outer periphery of the vacuum valve diaphragm is formed with an annular bead 66 for reception within the valve housing. The inner periphery of the vacuum valve 62 is formed with a sleeve portion 67 for alignment of the vacuum valve 62 with the air valve 68.

The air valve 68 is formed in the valve housing 69 which is bolted to the valve supporting structure by means of a plurality of bolts 70. The vacuum valve 62 and the air valve 68 engage a valve seat member 71. The valve seat member 71 is fastened on the inner periphery of the valve seat diaphragm 72. The outer periphery of the valve seat diaphragm 72 forms a bead which is received within the valve housing to form a seal about its outer periphery. The inner periphery of the valve seat member 71 also receives a second valve seat diaphragm 73 and is retained in this position by the spring retainer 75. The spring 76 received in the spring retainer 75 biases the valve seat member 71 to contacting position with the air valve in its normally retracted position. The spring 65 biases the vacuum valve in spaced relation to the valve seat member 71 in its normally retracted position.

The central portion of the second valve seat diaphragm 73 is centrally supported under a disk 77 which is fastened with a screw 78. A cover plate 79 encloses the end portion of the valve means 55.

The valve means 55 forms a vacuum chamber 81 which is formed by the valve housing 69, the vacuum valve diaphragm 63 and the vacuum valve 62. The valve piston 56 extends into the vacuum chamber and is received within the vacuum valve 62. An air valve chamber 82 is formed by the valve housing and air valve 68 in combination with the valve seat diaphragm and the valve seat member. The air valve chamber 82 is in communication with the atmosphere at all times.

A modulated air chamber 83 is formed by the housing, the air valve, the vacuum valve diaphragm 63 and the vacuum valve member 62 together with the valve seat member 71. The modulated air chamber is in communication with the variable pressure chamber 54 of the booster unit through the conduit 93.

An auxiliary modulated air chamber 85 is in communication with a modulated air chamber 83 through a plurality of passages 86. The plurality of passages 86 provide an equalization of the pressure on the opposing sides of the valve seat member 71. With the equalization of the pressure on opposing sides of the valve seat member, the operation of the air valve and the vacuum valve is unobstructed by elimination of any differential of the air pressures. This provides a free unobstructed movement of the valve seat member which operates in response to the biasing force of the spring 76.

The operation of this device will be described in the following paragraphs. As the brake pedal 1 is depressed, the push rod 3 moves forwardly with the master piston 4 to pressurize fluid within the fluid chamber 90 of the master cylinder 8. Pressurization of the fluid within the chamber 90 also pressurizes the fluid in the passage 15 and the follow-up chamber 23 as well as the pressurizing chamber 22 of the power master cylinder. As the power master cylinder is completely filled with hydraulic fluid, there is no movement of fluid in or out of the power master cylinder. The forward end of the master cylinder contains the check valve assembly 25 wherein the pressurization of fluid of approximately 50 pounds per square inch is required to open the valve element 30 from the valve seat 29. The pressurization fluid in the follow-up chamber 23 increases. This increase in fluid pressure is transmitted through the passage 59 to the pressurizing chamber 58 for the valve piston 56. The valve piston 56 operates against the biasing force of the vacuum valve spring 65 to move the vacuum valve forward in the valve means. The continued increased pressurization within the manually operated master cylinder 8 increases the pressure within the chamber 58 operating the valve control piston. The vacuum valve 62 contacts the vacuum valve seat 91 on the valve seat member 71. Continued movement of the valve piston 56 and the vacuum valve 62 moves the valve seat member 71 and unseats the air valve seat 92 from the air valve 68. In this position the air from the air chamber 82 is permitted to pass through the open air valve into the modulated air chamber 83. The increase in pressure in the modulated air chamber 83 also increases the pressure in the conduit 93 and the variable pressure chamber 54 of the booster unit 44. As the pressure builds up in the modulated air chamber 83 a reaction is transmitted back to the valve piston 56 through the vacuum valve 62 by way of diaphragm 63.

With the increase in pressure in the modulated air chamber 81 the pressure also increases within the auxiliary modulated air chamber 85 through the plurality of passages 86. The vacuum valve 62 and the vacuum valve diaphragm 63 form a fluid tight wall which receives the reaction force from the modulated air chamber. The auxiliary modulated air chamber 85 does not transmit a force on the vacuum valve as the central portion is anchored to the end plate 79. Equalization with the air in the modulated air chamber provides equal opposing pressure forces upon the valve seat member 71. This permits a free movement of the valve seat member which carries the air valve seat and the vacuum valve seat. This in turn provides a smooth operation of the valves with a minimum of sticking due to the suction on the valves caused by differential pressure on opposing sides of the valves and the valve seats. The pressure within the hydraulic actuating fluid system is increased due to the pressure increase within the modulated air chamber of the valve means and the variable pressure chamber 54 in the booster unit 44 which drives the power piston 16 forwardly and pressurizing fluid within the pressurizing chamber 22 of the master cylinder.

The valve element 29 remains closed until the power wall moves forward increasing the pressurization in the pressurizing chamber 22. At this point the pressure increases over the approximately 50 pounds per square inch and the valve element 29 is opened from the valve seat 30. The increased pressurization within the passage 35 expands the brake shoes against the vehicle brake drums and actuates the vehicle brakes. It can be seen from the above description that the reaction transmitted to the manually operated brake pedal 1 is in direct proportion to the increase in pressurization in the modulated air chamber.

The check valve in the forward end of the power master cylinder 25 is not open until the valve means is actuated and the booster unit is in operation. The pressure within the follow-up chamber of the power master cylinder 12 increases as the pressure within the chamber 58 operates the air valve piston 56. In effect, however, none of the reaction is transmitted from the power master cylinder 12 as the force of the fluid in the follow-up chamber 23 assists in the operation of the vehicle brakes. Only a volume change is realized on the brake pedal 1.

As the brake pedal 1 is released the pressure within the passage 35 is also released and the check valve assembly 25 also permits return of fluid through the check valve. The decreased force on the brake pedal 1 returns the brake pedal and decreases the pressure in the actuating chamber 58 for the valve means. This in turn permits the retraction of the vacuum valve member 62 and reseats the air valve seat 92 on the air valve 68. With the opening of the vacuum chamber 81 with the modulated air chamber 83 the variable pressure chamber 54 is again evacuated thereby permitting the retraction of the power wall 46 by the spring 47. With the retraction of the power wall the pressure decreases within the pressurizing chamber 22 of the power master cylinder 12. The fluid in the passage 35 returns through the check valve assembly 25 as the power master piston 16 returns to its normally retracted position. In the event of a partial vacuum in the passages 36 and 35 the check valve 38 is permitted to open allowing the entrance of fluid from the manually operated master cylinder reservoir 9. This provides a means for replenishing the fluid in the fluid system at all times.

It can be seen from the above description that the reaction supplied to the manually operated master cylinder is in direct response to pressurization of expansible fluid within the modulated air chamber. This in turn is in direct proportion to the actuation of the booster unit 44. By employing the venting means to the manually operated master cylinder reservoir, the fluid in the power operated master cylinder 12 and the fluid lines to the wheel cylinders are maintained full of fluid. The reaction is from the valve means and in response to the pressure in the modulated air chamber.

The balance valve seat member forms an auxiliary modulated air chamber permits equalization of pressure forces on opposite sides of the valve seat member to provide a free and unobstructed operation of the valve seat member in response to the single spring biasing the valve seat member to a contacting position on the air valve in its normally retracted position. As the valve seat member 71 is moved axially away from the air valve 68 due to the actuating force through the vacuum valve 62, the valve seat diaphragms 72 and 73 are flexed thereby permitting this movement against the biasing force of the spring 76. The diaphragms flex on a concentric circle substantially equally to the mating air valve and vacuum valve. The air valve being substantially concentric and of the same diameter as the flexing portion of the outer diaphragm 72 and the vacuum valve 62 being substantially of the same diameter as the flexing portion of the inner diaphragm 73.

The air pressure force within the auxiliary modulated air chamber 85 is substantially equal to the pressure on the opposing side of the valve seat member 71 in the modulated air chamber 83. The central portion of the diaphragm 73 is mounted on the end plate 79, and although the pressure changes within the vacuum chamber 81, it is not realized as a force against the vacuum valve 62. The disc 77 receives the force due to the differential pressure in the auxiliary modulated air chamber 85 and the vacuum chamber 81.

The pressure on the valve seat member 71 is equalized through the plurality of passages 86 and thereby causes no opposing force on the valve seat member 71 as the pressure is changed within the modulated air chamber 83 and the auxiliary modulated air chamber 85. This type of a valve operation provides a balance of the pressure forces operating on the valve seat member 71 and provides for smooth operation of the valve means in controlling the operation of the booster unit.

While the embodiments of the present invention as herein disclosed, constitute a preferred form it is to be understood that other forms might be adopted.

What is claimed is as follows:

1. In a brake booster unit having a power unit and a power operated hydraulic fluid displacement means for brake actuation connected with a power wall in said power unit that divides the interior of said booster unit into a generally constant pressure chamber and a variable pressure chamber and operates said fluid displacement means, said constant pressure chamber having a constant pressure therein and said variable pressure chamber having a variable pressure therein; a control valve for controlling pressure in the variable pressure chamber of the booster unit comprising, a valve housing, a hollow annular subatmospheric pressure control valve operating in said valve housing and supported on its outer periphery by a diaphragm, an annular atmosphere pressure control valve formed on an inner peripheral portion of said valve housing and disposed concentric with said first mentioned annular valve, a valve seat member supported in said housing on a second diaphragm and resiliently biased by resilient means to a contacting position with said atmosphere pressure control valve, resilient means biasing said subatmosphere pressure control valve into spaced relation to said valve seat member to place a subatmosphere chamber in said valve housing formed by a wall of said housing and said first mentioned diaphragm in communication with a variable pressure chamber in said valve housing formed between said first and second mentioned diaphragms and thereby in connection with the said variable pressure chamber in said power unit, manually operated control means moving said subatmosphere pressure control valve to a contacting position with said valve seat member and moving said valve seat member in spaced relation to said atmosphere pressure control valve to connect thereby an atmospheric chamber formed between said inner peripheral projection in said housing and said second mentioned diaphragm with said variable pressure chamber in said valve housing and therethrough with said variable pressure chamber in said booster unit to provide power operation of said booster unit, said variable pressure in said variable pressure chamber in said valve housing acting on said first mentioned diaphragm to effect a reaction force on said subatmosphere pressure control valve transmitted thereby to said manually operated control means.

2. In a brake booster unit having a power unit and a power operated hydraulic fluid displacement means for brake actuation connected with a power wall in said power unit that divides the interior of said booster unit into a generally constant pressure chamber and a variable pressure chamber and operates said fluid displacement means; a control valve for controlling pressure in the variable pressure chamber of the booster unit comprising, a valve housing, a hollow annular subatmospheric pressure control valve operating in said valve housing and supported on its outer periphery by a diaphragm, an annular atmosphere pressure control valve formed on an inner peripheral portion of said valve housing and disposed concentric with said first mentioned annular valve, a valve seat member supported in said housing on a second diaphragm and resiliently biased by resilient means to a contacting position with said atmosphere pressure control valve, resilient means biasing said subatmosphere pressure control valve into spaced relation to said valve seat member to place a subatmosphere chamber in said valve housing formed by a wall of said housing and said first mentioned diaphragm in communication with a variable pressure chamber in said valve housing formed between said first and second mentioned diaphragms and thereby in connection with the said variable pressure chamber in said power unit, an auxiliary variable pressure chamber in said valve housing formed by said second mentioned diaphragm and a wall of said housing and disposed on the opposite side of said second mentioned diaphragm relative to said variable pressure chamber in said valve housing, said valve seat member having opening means therein fluid connecting said variable pressure chamber in said valve housing and said auxiliary variable pressure chamber to balance thereby pressures on opposite sides of said valve seat member when said variable pressure chamber in said housing has variable pressure therein above atmosphere, manually operated control means moving said subatmosphere pressure control valve to a contacting position with said valve seat member and moving said valve seat member in spaced relation to said atmosphere pressure control valve to connect thereby an atmospheric chamber formed between said inner peripheral projection in said housing and said second mentioned diaphragm with said variable pressure chamber in said valve housing and therethrough with said variable pressure chamber in said booster unit to provide power operation of said booster unit, said variable pressure in said variable pressure chamber in said valve housing acting on said first mentioned diaphragm to effect a reaction force on said subatmosphere pressure control valve transmitted thereby to said manually operated control means.

3. Apparatus constructed and arranged in accordance with the structure set forth in claim 2 wherein said second mentioned diaphragm has a portion thereof exposed on one side to atmosphere pressure and on the opposite side to subatmosphere pressure when said valve seat member engages said atmosphere control valve and is disengaged from said subatmosphere control valve to fluid pressure bias thereby said valve seat member in a direction of unseating from said atmosphere control valve.

4. In a brake booster unit having a power unit and a power operated hydraulic fluid displacement means for brake actuation connected with a power wall in said power unit that divides the interior of said booster unit into a generally constant pressure chamber and a variable pressure chamber and operates said fluid displacement means; a valve housing, control valve means in said valve housing for control of pressure in the variable pressure chamber of the booster unit comprising, a vacuum valve diaphragm, a vacuum valve supported by said vacuum valve diaphragm and forming therewith a vacuum chamber, an air valve, a valve seat member supporting an air valve seat and a vacuum valve seat, a diaphragm supporting said valve seat member and forming with said valve seat member and said air valve an air chamber, a modulated air pressure chamber between said vacuum chamber and said air chamber and formed by said air valve and said vacuum valve and vacuum valve diaphragm, an auxiliary modulated air chamber formed by said valve housing and valve seat member and the diaphragm supporting the same and in communication with said modulated air chamber through a plurality of passages in said valve seat member, said valve seat diaphragm including a central diaphragm portion supported on a wall of said housing, means biasing said valve seat member to a contacting position with said air valve, resilient means biasing said vacuum valve in spaced relation to said valve seat member when said valve seat member contacts said air valve, and means for transmitting reaction from said modulated air chamber of said control valve means including said vacuum valve diaphragm and said vacuum valve.

5. In a brake booster unit having a power unit and a power operated hydraulic fluid displacement means for brake actuation connected with a power wall in said power unit that divides the interior of said booster unit into a generally constant pressure chamber and a variable pressure chamber and operate said fluid displacement means; a control valve for controlling pressure in the variable pressure chamber of the booster unit comprising, a valve support member, a generally hollow valve housing in said support member closed at one end by said support member and forming a valve operating chamber, a cover plate on said housing closing the hollow interior of the housing at the opposite end thereof, a hollow annular subatmospheric pressure control valve positioned in said chamber and supported on its outer periphery by a diaphragm having its outer periphery secured between said support and said housing and forming thereby a subatmosphere pressure chamber, an annular atmospheric pressure control valve formed on an inner peripheral portion of said valve housing and disposed concentric with said first mentioned annular valve, a valve seat member positioned in said chamber on a second diaphragm having its outer periphery secured between said housing and said cover plate and resiliently biased by resilient means to a contacting position with said atmosphere pressure control valve, resilient means biasing said subatmosphere control valve into spaced relation to said valve seat member to place said subatmosphere chamber in fluid communication with a variable pressure chamber in said valve housing formed between said first mentioned diaphragm and said valve seat member therethrough in connection with the first variable pressure chamber in said power unit, manually operated control means moving said subatmosphere pressure control valve to a contacting position with said valve seat member and moving said valve seat member in spaced relation to said atmosphere pressure control valve to connect thereby an atmospheric pressure chamber formed between said inner peripheral projection in said housing and said second mentioned diaphragm with said variable pressure chamber in said valve housing and therethrough with said variable pressure chamber in said booster unit to provide power operation of said booster unit, said variable pressure in said variable pressure chamber in said valve housing acting on said first mentioned diaphragm to effect a reaction force on said subatmosphere pressure control valve transmitted thereby to said manually operated control means.

6. In a brake booster unit having a power unit and a power operated hydraulic fluid displacement means for brake actuation connected with a power wall in said power unit that divides the interior of said booster unit into a generally constant pressure chamber and a variable pressure chamber and operate said fluid displacement means; a control valve for controlling pressure in the variable pressure chamber of the booster unit comprising, a valve support member, a generally hollow valve housing in said support member closed at one end by said support member and forming a valve operating chamber, a cover plate on said housing closing the hollow interior of the housing at the opposite end thereof, a hollow annular subatmospheric pressure control valve positioned in said chamber and supported on its outer periphery by a diaphragm having its outer periphery secured between said support and said housing and forming thereby a subatmosphere pressure chamber, an annular atmospheric pressure control valve formed on an inner peripheral portion of said valve housing and disposed concentric with said first mentioned annular valve, a valve seat member positioned in said chamber on a second diaphragm having its outer periphery secured between said housing and said cover plate and resiliently biased by resilient means to a contacting position with said atmosphere pressure control valve, resilent means biasing said subatmosphere control valve into spaced relation to said valve seat member to place said subatmosphere chamber in fluid communication with a variable pressure chamber in said valve housing formed between said first mentioned diaphragm and said valve seat member therethrough in connection with the first variable pressure chamber in said power unit, an auxiliary variable pressure chamber in said valve housing formed by said second mentioned diaphragm and a wall of said housing and disposed on the opposite side of said second mentioned diaphragm relative to said variable pressure chamber in said valve housing, said valve seat member having opening means therein fluid connecting said variable pressure chamber in said valve housing and said auxiliary variable pressure chamber to balance thereby pressures on opposite sides of said valve seat member when said variable pressure chamber in said housing has variable pressure therein above atmosphere, manually operated control means moving said subatmosphere pressure control valve to a contacting position with said valve seat member and moving said valve seat member in spaced relation to said atmosphere pressure control valve to connect thereby an atmospheric pressure chamber formed between said inner peripheral projection in said housing and said second mentioned diaphragm with said variable pressure chamber in said valve housing and therethrough with said variable pressure chamber in said booster unit to provide power operation of said booster unit, said variable pressure in said variable pressure chamber in said valve housing acting on said first mentioned diaphragm to effect a reaction force on said subatmosphere pressure control valve transmitted thereby to said manually operated control means.

References Cited in the file of this patent

UNITED STATES PATENTS

| | | |
|---|---|---|
| 2,433,953 | Ingres | Jan. 6, 1948 |
| 2,853,977 | Sadler | Sept. 30, 1958 |
| 2,872,905 | Chouings | Feb. 10, 1959 |
| 2,910,051 | Hupp | Oct. 27, 1959 |
| 2,997,850 | Hupp | Aug. 29, 1961 |

FOREIGN PATENTS

| | | |
|---|---|---|
| 213,357 | Switzerland | May 1, 1941 |